(12) United States Patent
Cuomo et al.

(10) Patent No.: US 10,984,483 B2
(45) Date of Patent: Apr. 20, 2021

(54) COGNITIVE REGULATORY COMPLIANCE AUTOMATION OF BLOCKCHAIN TRANSACTIONS

(71) Applicant: International Business Machines Corporation, Armonk, NY (US)

(72) Inventors: Gennaro A. Cuomo, Durham, NC (US); Donna N. Dillenberger, Yorktown Heights, NY (US); Rong Liu, Sterling, VA (US); Roman Vaculin, Bronxville, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 15/462,875

(22) Filed: Mar. 19, 2017

(65) Prior Publication Data

US 2018/0268491 A1    Sep. 20, 2018

(51) Int. Cl.
```
G06Q 20/06      (2012.01)
H04L 9/06       (2006.01)
H04L 9/14       (2006.01)
G06Q 10/08      (2012.01)
G06Q 40/00      (2012.01)
```
(52) U.S. Cl.
CPC ......... *G06Q 40/12* (2013.12); *G06Q 10/0833* (2013.01)

(58) Field of Classification Search
CPC ............................ G06Q 40/12; G06Q 10/0833
See application file for complete search history.

(56) References Cited

U.S. PATENT DOCUMENTS

| | | | |
|---|---|---|---|
| 10,158,479 B2* | 12/2018 | Chapman | H04L 9/3239 |
| 2008/0065436 A1 | 3/2008 | Wu et al. | |
| 2016/0267474 A1 | 9/2016 | Lingham et al. | |
| 2017/0243193 A1* | 8/2017 | Manian | G06Q 20/065 |
| 2017/0286880 A1* | 10/2017 | Wiig | G06Q 10/067 |
| 2018/0189753 A1* | 7/2018 | Konda | G06Q 20/06 |

(Continued)

FOREIGN PATENT DOCUMENTS

| | | |
|---|---|---|
| CN | 105976231 A | 9/2016 |
| CN | 106357612 A | 1/2017 |

(Continued)

OTHER PUBLICATIONS

List of IBM Patents or Patent Applications Treated as Related, Jun. 14, 2018.

(Continued)

*Primary Examiner* — Talia F Crawley (57) ABSTRACT

A blockchain of transactions may be referenced for various purposes and may be later accessed by interested parties for ledger verification and information retrieval. One example method of operation may include extracting obligation data from one or more of documents and rules, identifying transaction data from one or more blockchain transactions, creating one or more transaction contexts based on the transaction data, comparing the obligation data to the transaction data to identify whether the one or more transaction contexts are subject to the obligation data, and creating a notification including a current compliance status between the transaction contexts and the obligation data.

20 Claims, 7 Drawing Sheets

(56) References Cited

U.S. PATENT DOCUMENTS

2018/0225640 A1\* 8/2018 Chapman ........... G06Q 20/0855
2018/0225660 A1\* 8/2018 Chapman ........... G06Q 20/3827
2018/0227116 A1\* 8/2018 Chapman .............. H04L 9/0643

FOREIGN PATENT DOCUMENTS

| CN | 106445993 A | 2/2017 |
|---|---|---|
| CN | 106453407 A | 2/2017 |
| CN | 106506203 A | 3/2017 |
| GB | 2540975 A | 2/2017 |
| JP | 2008065828 A | 3/2008 |
| JP | 2014215912 A | 11/2014 |
| WO | 2015175722 A1 | 11/2015 |

OTHER PUBLICATIONS

Gennaro A. Cuomo et al, Cognitive Regulatory Compliance Automation of Blockchain Transactions, U.S. Appl. No. 15/462,873, filed Mar. 19, 2017.
Gennaro A. Cuomo et al, Automatic Generating Analytics From Blockchain Data, U.S. Appl. No. 15/462,877, filed Mar. 19, 2017.
International Search Report and Written Opinion, PCT/IB2017/057676, dated Apr. 28, 2018.
International Search Report and the Written Opinion, PCT/IB2017/057678, dated Dec. 6, 2017.
Notice of Reasons for Refusal issued in the Corresponding JP Application No. 2019-549401, drafted on Dec. 24, 2020 by Patent Examiner Hideto Hara.

\* cited by examiner

Export Regulation Certificate — 210

Description: Asset export information including exporter, importer, certificates, verification, etc.

Available Attributes:

certificateBatchNumber
hasPaperKBCUploaded ☑
creationDate
expiryDate
exportCountry ☑
exportDate
exportCountry
hasPaperKBCUploaded
verifiedBy
verifierDetails
verifyDate
weight
shippedDate

220

Compliance Condition

Condition:

ANY:
  IF exportCountry in participatingCountries AND hasPaperKBCUploaded is TRUE
  IF exportCountry not in participatingCountries Check against: ☑ blockchain ledger  ☑ blockchain state

Non-compliance Condition

COGNITIVE REGULATORY COMPLIANCE AUTOMATION OF BLOCKCHAIN TRANSACTIONS

CROSS-REFERENCE TO RELATED APPLICATIONS

This application is related to co-pending application Ser. Nos. 15/462,873 and 15/462,877, filed on even date herewith, the entire contents of which are hereby incorporated by reference in their entirety.

TECHNICAL FIELD

This application relates to a regulatory compliance application, and more particularly, to identifying specific information in blockchain transactions and comparing regulatory standards to such information for compliance requirements.

BACKGROUND

The blockchain may be used as a public ledger to store any type of information. Although, primarily used for financial transactions, the blockchain can store any type of information including assets (i.e., products, packages, services, status, etc.). The blockchain may be used to securely store any type of information in its immutable ledger. Decentralized consensus is different from the traditional centralized consensus, such as when one central database used to rule transaction validity. A decentralized scheme transfers authority and trusts to a decentralized network and enables its nodes to continuously and sequentially record their transactions on a public "block," creating a unique "chain" referred to as the blockchain. Cryptography, via hash codes, is used to secure the authentication of the transaction source and removes the need for a central intermediary.

In today's highly regulated and global environment, organizations have to comply with compliance, regulatory policies, and industry standards for most all products and services offered by such organizations. It is often challenging to design a transaction system ingested with all the obligations. Moreover, regulatory policies or industry standards are constantly experiencing changes, but transaction systems may not be able to respond to the changes quickly.

SUMMARY

One example method of operation may include extracting obligation data from one or more of documents and rules, identifying transaction data from one or more blockchain transactions, creating one or more transaction contexts based on the transaction data, comparing the obligation data to the transaction data to identify whether the one or more transaction contexts are subject to the obligation data, and creating a notification comprising a current compliance status between the transaction contexts and the obligation data.

Another example embodiment may include an apparatus that provides a processor configured to extract obligation data from one or more of documents and rules, identify transaction data from one or more blockchain transactions, create one or more transaction contexts based on the transaction data, compare the obligation data to the transaction data to identify whether the one or more transaction contexts are subject to the obligation data, and a transmitter configured to transmit a notification comprising a current compliance status between the transaction contexts and the obligation data.

Still another example embodiment may include a non-transitory computer readable storage medium configured to store instructions that when executed causes a processor to perform extracting obligation data from one or more of documents and rules, identifying transaction data from one or more blockchain transactions, creating one or more transaction contexts based on the transaction data, comparing the obligation data to the transaction data to identify whether the one or more transaction contexts are subject to the obligation data, and creating a notification comprising a current compliance status between the transaction contexts and the obligation data.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide for shared ledger transaction management and monitoring and auditing of such transactions for compliance purposes. Blockchain network members may grant permission to an intelligent agent to perform tasks on behalf of the network, such as ongoing management and auditing of transactions for compliance with third party standards (i.e., industry standards). For example, a cognitive agent can provide continuous auditing and provide alerts, which ensures all registered members are in regulatory compliance with regulatory standards. Smart contracts may be created to include the necessary information needed for processing the regulatory-compliant transactions. Also, the smart contracts can be setup to continuously obtain new contract law and evolve the contracts as the regulations evolve. For example, a monthly regulation report may be created by an international standards committee, and the rules and regulations may be tabulated and accepted by the smart contract according to specific guidelines and customized for the particular business entity's own format. As the rules change, so may the smart contract which when executed can ensure regulations are being maintained and updated. Also, cognitive feedback technology can be used to modify blockchain smart contracts into cognitive contracts, which continually adopt and learn additional requirements/rules/guidelines. Additionally, the auditing and monitoring may be entirely automated to monitor, update and execute compliance standards.

check blockchain transactions against the rules, creating smart contracts based on the rules, deploying and invoking the smart contracts, and creating a compliance dashboard to display compliance checking results.

In this configuration, a transaction context is created for transactions based on textual information of transaction attributes, including values, names, and business vocabulary. This transaction context is used to search for applicable obligations in regulatory documents and other rule information sources. If a matching obligation is found automatically, it is transformed into rules that can be executed against the transactions to ensure regulatory compliance. According to one example, a transaction context may include asset data, such as sample attributes: "origin": {"type": "string"}, "shape": {"type": "string"}, "weight": {"type": "float"}, "length": {"type": "float"}, "width": {"type": "float"}, "depth": {"type": "float"}, and "color": {"type": "string"}. Those attributes may be describing any asset, such as a vacuum cleaner, a diamond, a motor vehicle, etc.

Examples of compliance data retrieved from a compliance document may include sample attributes: "certificateBatchNumber": {"type": "int"}, "creationDate": {"type": "date"}, "expiryDate": {"type": "date"}, "exportCountry": {"type": "string"}, and "exportDate": {"type": "date"}. A transaction context may be defined by attributes in the transaction data along with certain business vocabulary. For example, if a shipment transaction contains the following attributes, in the example below, then this transaction context contains information regarding trading items, importer/exporter countries, and rules regarding an export permit, etc. If there is an obligation regarding specific permits required between trading product X between US and UK, then this obligation can be matched with this transaction context, an example of which provides:

```
Shipment
{
"permitID": "123456778",                              # Export permit ID
"permitCreationDate": "2016-11-07T12:47:53.265Z",     # Permit creation Date
"permitExpiryDate": "2017-01-06T12:47:53.265Z",       # Permit expiry Date
"exportCountry": "USA",                               # Export Country
"exportDate": "2016-11-07T12:00:00.000Z",             # Export Date
"exporterName": "Company A",                          # Exporter Name
"importCountry": "UK"                                 # Importer Name
"importerName": "Company B"                           # Importer Name
"items":            {                                 # Exported products
"productID":       "abc"                              # Product ID
"productName":     "X"                                # Product Name.
```

According to one example, a cognitive method, device and system to perform automated compliance checks of blockchain transactions may provide analysis, identification, and searching of obligations through regulatory documents. An integrated blockchain configuration with a virtual machine or other computing platform can perform such functions and determine what types of obligations are relevant to the blockchain, such as which are enforceable on the blockchain, etc. The transaction data may be transformed to generate transaction contexts which may be matched to the obligations to identify a status of those blockchain transactions. Any transfers, sales, etc., of products or services can quickly be recognized, identified by context (i.e., industry, business entities, international/national, etc.), and then those contexts can be matched to relevant regulations for compliance determinations. Any matched obligations can be converted into executable rules, in terms of blockchain data attributes, with/without human interference, and the obligations may be matched for obtaining permissions to The transaction entity may be a set of transaction attributes (e.g., import/export countries, product name, etc.), and the obligation data may be a set of transaction attributes. In this example, the obligation is the determination as to whether a valid permit exists for such international exports. In the example "executing the rules" provides for checking every transactions with a granted access to ensure if it has a "transaction entity" (i.e., a context matched with the obligation), and if so, to ensure the "obligation data" exists (i.e., compliance). In the example, if product 'X' is traded between the US and the UK, the permit ID must be identified and checked to be valid, for example, against a list of valid permit data, and whether the permit has expired.

Figure 1A:
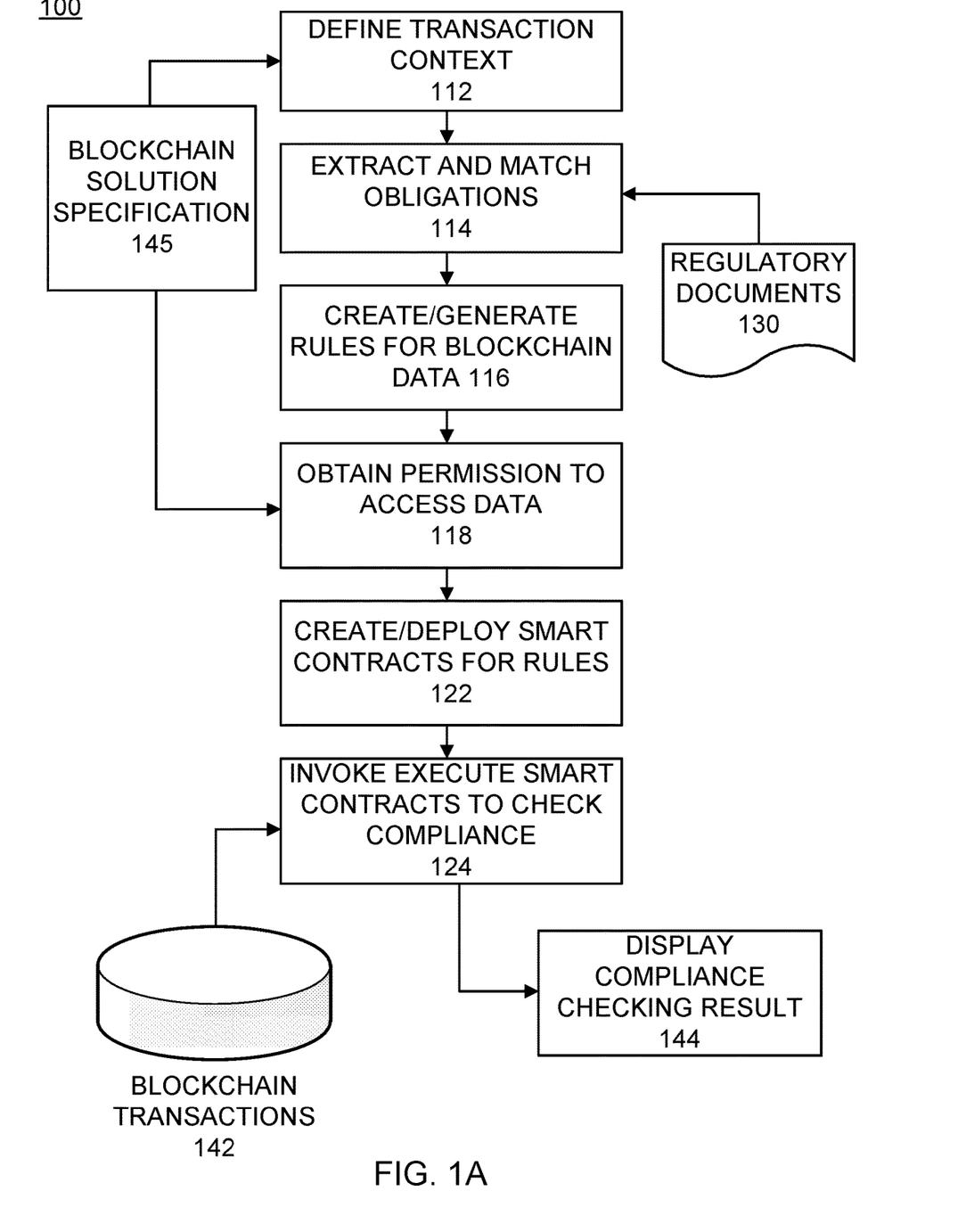
FIG. 1A illustrates a detailed logic diagram of a cognitive regulation data architecture configuration, according to example embodiments.

FIG. 1A illustrates a detailed logic diagram of a cognitive regulation data architecture configuration, according to example embodiments. Referring to FIG. 1A, the logic configuration 100 includes a series of logic operations which establish an architecture for identifying blockchain transaction data and determining whether there are any obligations present from the transaction data. For example, the blockchain solution specification 145 may be a template for creating a transaction context 112, which can then be used to extract and match obligations 114 based on regulatory document data 130. The operations may also include creating rules for the blockchain data 116, such as a customized approach to managing the data and comparing the data to all such necessary obligations. Permissions 118 may also be sought by the configuration to identify whether the entity performing the monitoring and auditing should have access to the data. The rules can then be established as a set of rules to follow and placed in a smart contract 122 for subsequent audit purposes. The smart contracts may be executed for initiating compliance measures 124 and the blockchain transactions 142 may be referenced to identify all such available transactions which meet the requirements of the smart contract. Once the results have been obtained, a graph or list of results may be sent by notification or to a dashboard display for compliance results 144. A compliance result may have rankings of various competitors as compared to the organization of interest. Also, any violations may be highlighted for easy identification purposes.

Figure 2:
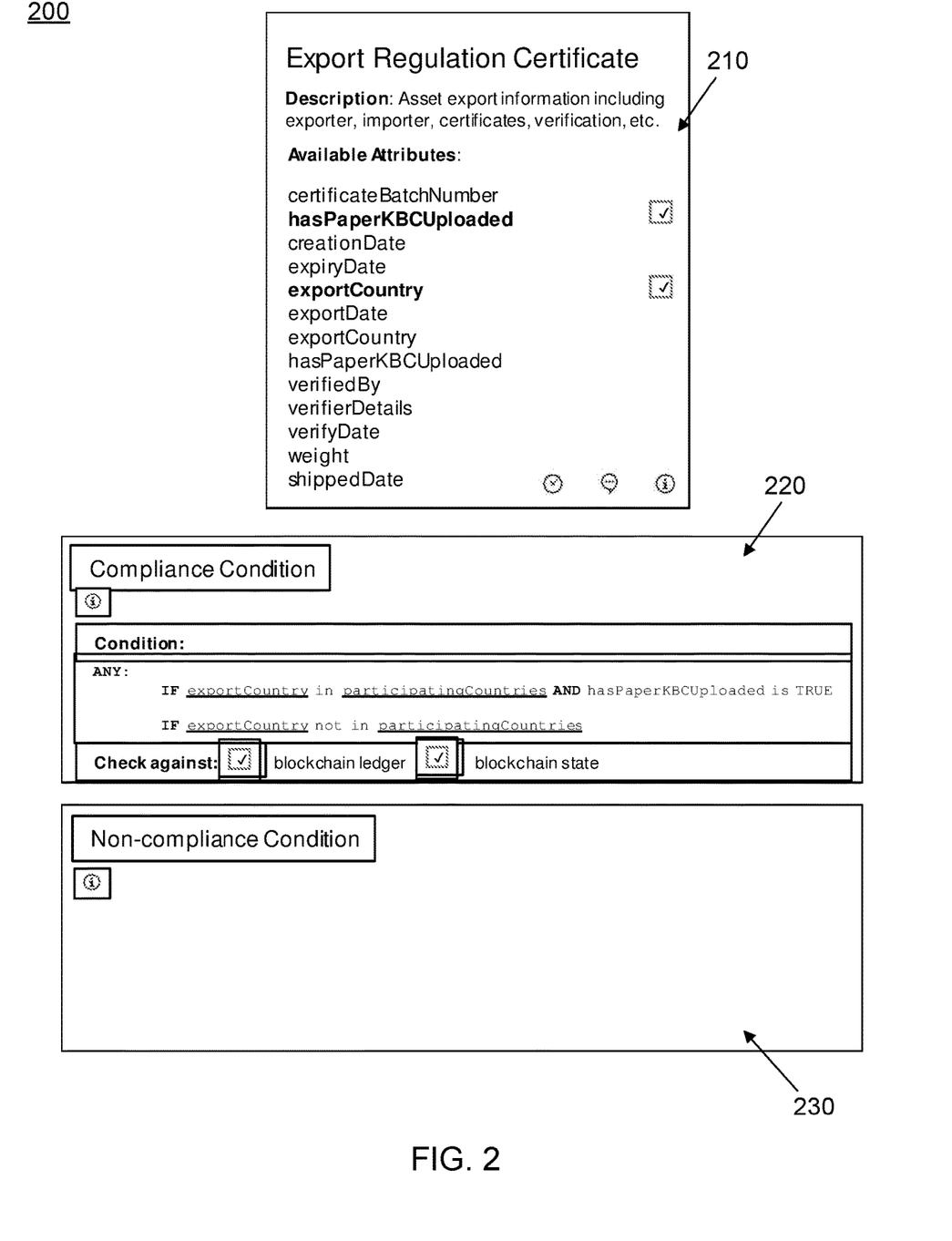
FIG. 2 illustrates a user interface of an export regulation service configuration, according to example embodiments.

The blockchain specification contains a transaction data model. A transaction data model may be based on specific transactions, however, the blockchain specification can provide more complete information. For example, some attributes may be optional and would be missing from some specific transactions. In 112, a context is defined based on transaction attributes and business vocabulary. In the example of FIG. 2, the context includes data attributes, such as import/export country, participant countries, and the list of participant countries, which are part of the business vocabulary. Natural language processing (NLP) techniques may be used to match the text with obligation sentences. For example, the sentence of an obligation is parsed to extract subjects (e.g., export company), objects (e.g., product X), modifiers (e.g., exporter country) etc. The parsed structure is compared with the context attributes for possible matching. After matching in operation 114, the rule may be created using the attribute names and the syntax of the obligation sentence/expression (e.g., if X then Y (or not Y), where X and Y are represented by matched attributes).

Figure 1B:
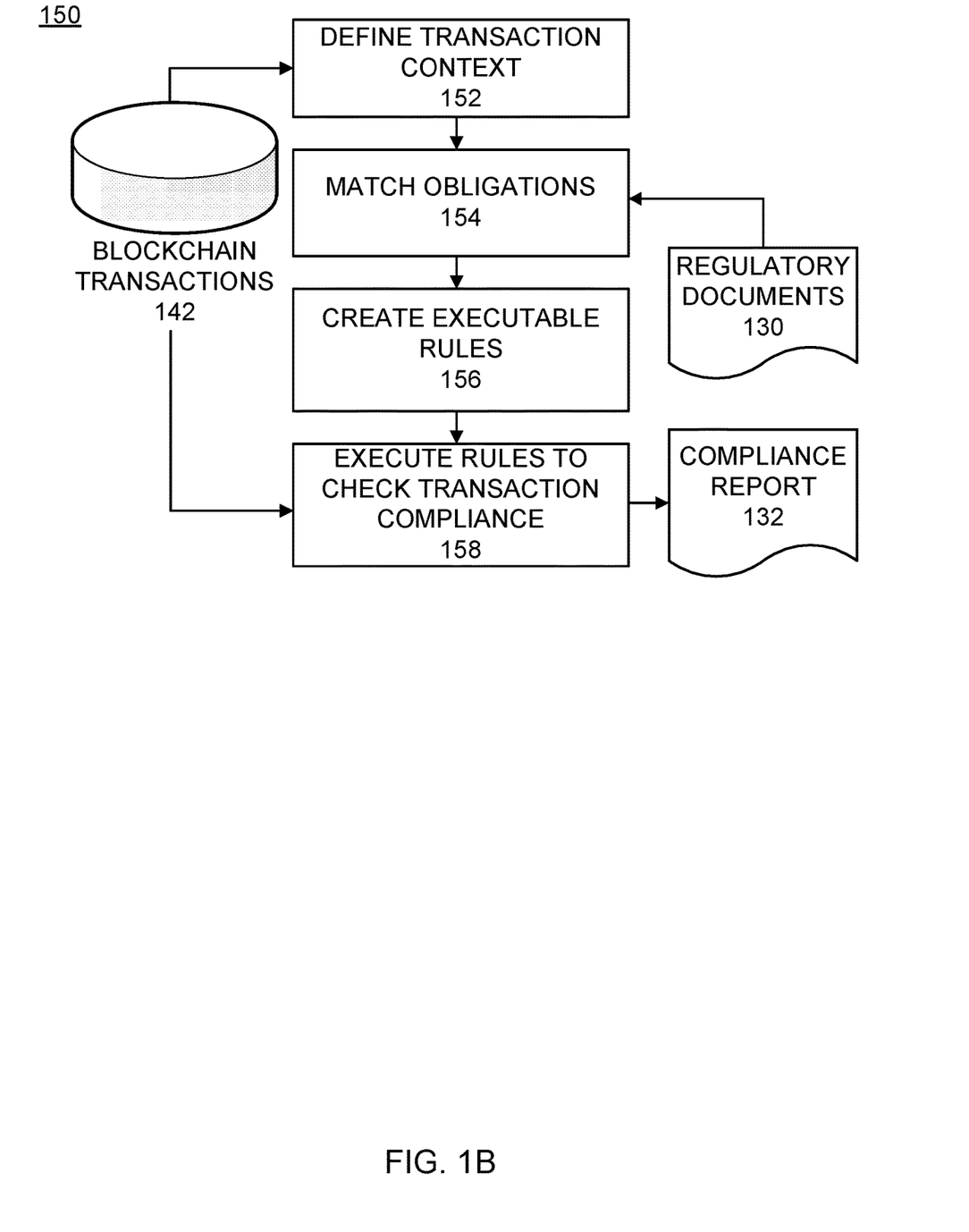
FIG. 1B illustrates a detailed logic diagram of a cognitive regulation data execution configuration, according to example embodiments.

FIG. 1B illustrates a detailed logic diagram of a cognitive regulation data execution configuration, according to example embodiments. Referring to FIG. 1B, the configuration 150 is a simplified execution model of FIG. 1A. In this example, the transaction context 152 may be defined prior to applying regulatory standards from various regulatory sources 130. The transaction data from the blockchain 142 may be compared to the obligations 154 and executable rules 156 are created and applied 158 to determine the compliance between existing transaction data and required obligation data. A compliance report 132 may be generated to capture all the discrepancies.

FIG. 2 illustrates a user interface of an export regulation service configuration, according to example embodiments. Referring to FIG. 2, the interface 200 demonstrates a list of attributes 210 which are related to the type of regulation/obligation included in the documents. The attributes are all part of the fields or data included in the regulation document. In the compliance portion 220, the logic statement may be setup to include one or more of the regulation certificate fields as a variable for examination to compare with the transaction data of the blockchain transactions. Also, non-compliance measures 230 may also be created as rules to identify instances of non-compliance.

Figure 3:
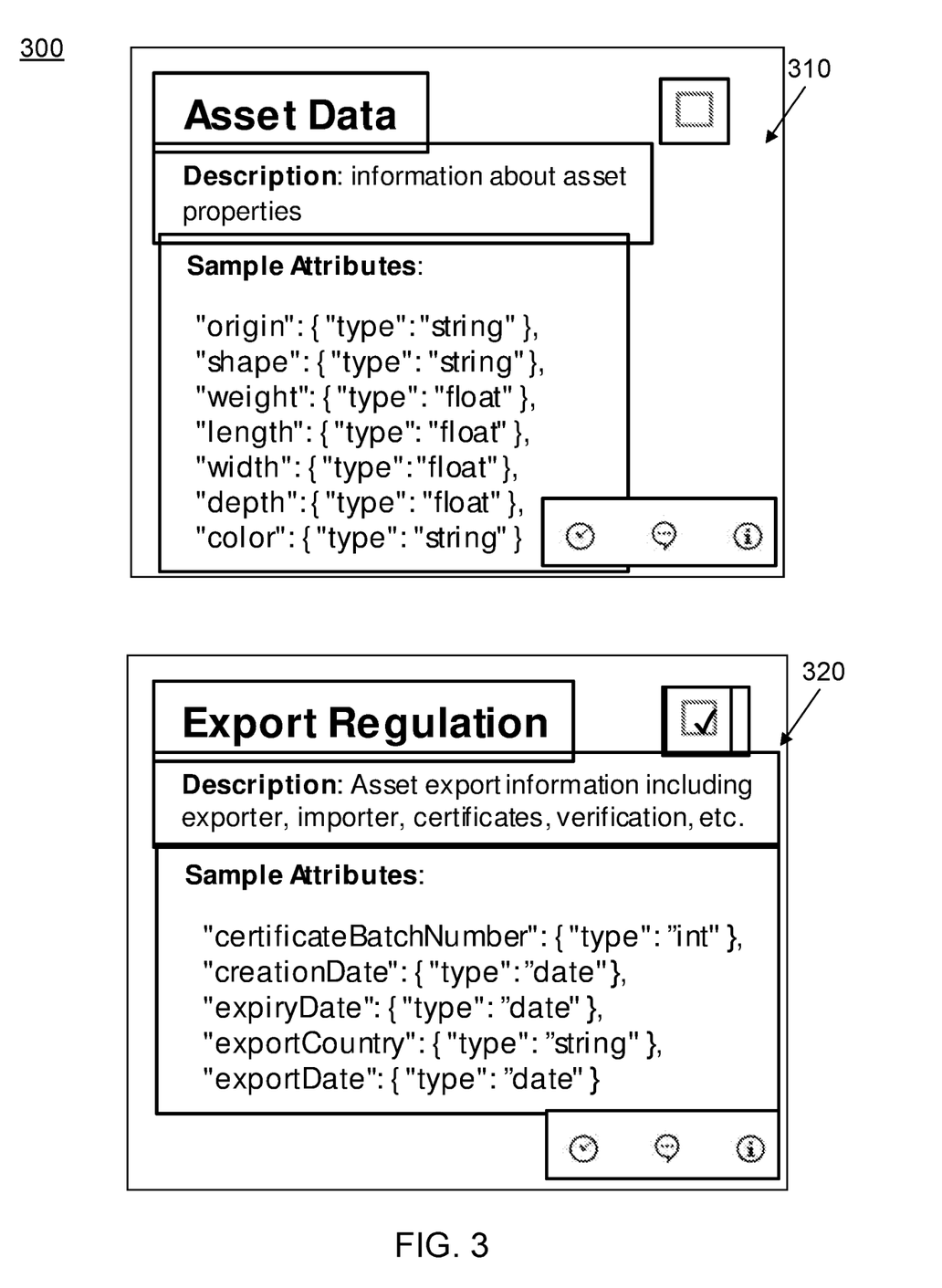
FIG. 3 illustrates a user interface of asset data and export regulation data, according to example embodiments.

FIG. 3 illustrates a user interface of asset data and export regulation data, according to example embodiments. Referring to FIG. 3, the example interfaces 300 demonstrate the data fields of an asset data report of a blockchain transaction(s). For example, this first interface 310 includes various attributes which are related to a particular type of asset, among the seven attributes are also different types of attributes, such as descriptors (string) and numbers (float). The export regulations of the export document retrieved 320 are requiring certain source, date, tracking, location and other information to verify the asset in detail. Depending on the value and amount of regulation of a particular asset type, the asset may have more or less regulatory standards which must be tracked. In this example, the asset is highly regulated both by its own attributes 310, which are derived from the blockchain transactions, and by the number and specificity of the regulations 320.

Figure 4:
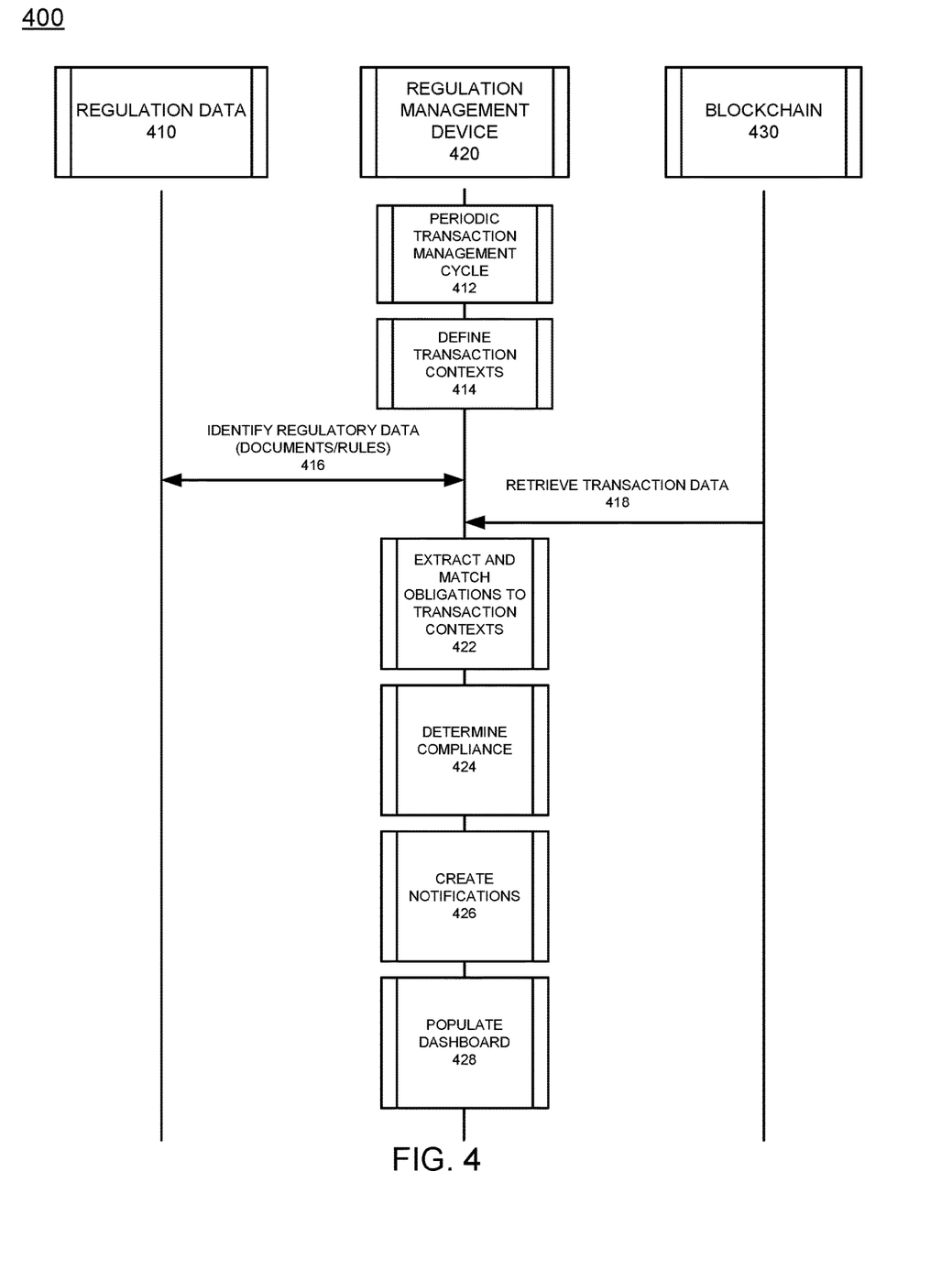
FIG. 4 illustrates a system signaling diagram of the interactions between a regulation computing platform and a blockchain, according to example embodiments.

FIG. 4 illustrates a system signaling diagram of the interactions between a regulation computing platform and a blockchain, according to example embodiments. Referring to FIG. 4, the system configuration 400 includes regulation data 410, a regulation management entity 420 and the blockchain 430. In this example, an assigned regulation device 420 may be setup as an extension of the blockchain, such as a stand-alone computing platform, virtual machine, container and database configuration, etc. The device system 420 would initiate a periodic transaction management cycle 412, which would execute periodically based on a timeline and provide regulation management to blockchain transactions. The transactions can be examined and certain transaction contexts may be defined 414 to correspond to the regulation data documents and rules 416. The transaction data can be retrieved 418 and all the transaction data attributes defined by the transactions contexts may be extracted and matched to the obligations of the transaction contexts 422. A compliance determination 424 may be performed based on those comparisons (e.g., pass, fail, caution, etc.). Notifications may be created 426 along with efforts to provide data needed to populate a dashboard 428. Interested parties may be registered to receive notifications via a registration procedure.

Figure 5:
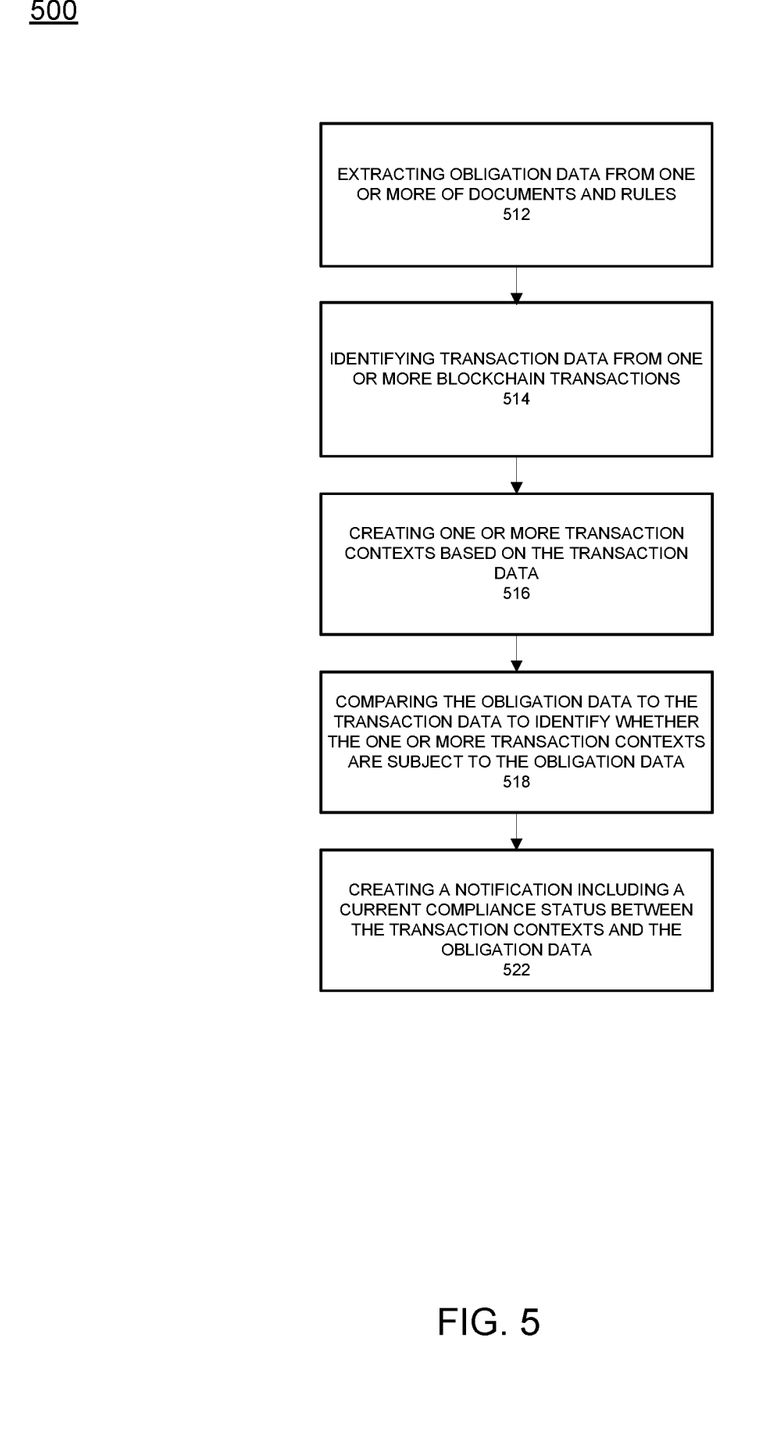
FIG. 5 illustrates a flow diagram of an example method of managing transaction auditing and regulatory compliance in the blockchain, according to example embodiments.

FIG. 5 illustrates a flow diagram of an example method of managing transaction auditing and regulatory compliance in the blockchain, according to example embodiments. Referring to FIG. 5, the method 500 may include extracting obligation data from one or more of documents and rules 512, identifying transaction data from one or more blockchain transactions 514, creating one or more transaction contexts based on the transaction data 516, comparing the obligation data to the transaction data to identify whether the one or more transaction contexts are subject to the obligation data 518, and creating a notification comprising a current compliance status between the transaction contexts and the obligation data 522. The method may also include identifying one or more transaction attributes from the transaction data, and the one or more transaction attributes comprise one or more of a company name, an individual's name, a financial figure, a financial account, a type of product, a geographical location, a transaction party, a date, and a time. This list is not finite and may include other types of transaction attributes. The obligation data may include one or more of a type of encryption, party data, quantity information, warranty information, location information, date information, location indicators, descriptions, trade rules and time information. This list is not finite and may include other types of obligation data. The example method may also include generating a compliance report or dashboard based on whether the one or more blockchain transactions include one or more transactions contexts which match the obligation data. The method may also include creating one or more executable rules based on the obligation data, and executing the one or more executable rules when comparing the transactions contexts to the obligation data, and transmitting the notification to a registered party. The method may include creating one or more smart contracts comprising the one or more executable rules, and executing the one or more smart contracts to process the transaction data of the one or more blockchain transactions.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent or be integrated in any of the above-described components, etc.

Figure 6:
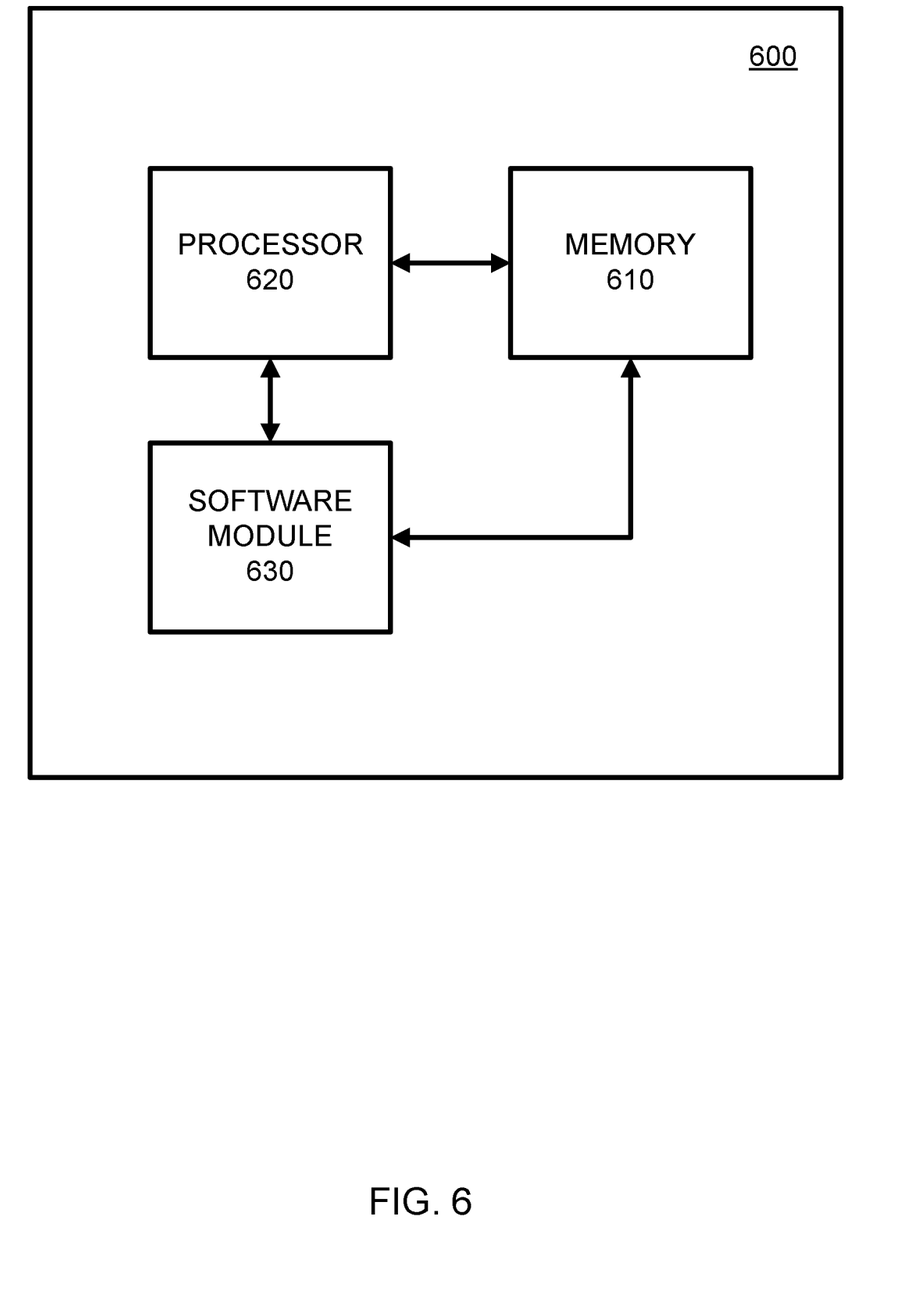
FIG. 6 illustrates an example network entity configured to support one or more of the example embodiments.

As illustrated in FIG. 6, a memory 610 and a processor 620 may be discrete components of a network entity 600 that are used to execute an application or set of operations as described herein. The application may be coded in software in a computer language understood by the processor 620, and stored in a computer readable medium, such as, a memory 610. The computer readable medium may be a non-transitory computer readable medium that includes tangible hardware components, such as memory, that can store software. Furthermore, a software module 630 may be another discrete entity that is part of the network entity 600, and which contains software instructions that may be executed by the processor 620 to effectuate one or more of the functions described herein. In addition to the above noted components of the network entity 600, the network entity 600 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
extracting obligation data from one or more of regulatory documents and regulatory information sources, the obligation data specifying requirements for compliance with one or more regulatory standards;
identifying transaction attributes from transaction data of a blockchain transaction, the transaction attributes including values describing an asset that is part of the blockchain transaction;
identifying a regulatory obligation included in the extracted obligation data that is related to the blockchain transaction based on the values describing the asset of the transaction attributes;
transforming the values describing the asset of the transaction attributes and the identified regulatory obligation into a rule based on syntax of the identified regulatory obligation and executing the rule with respect to the blockchain transaction to determine a compliance status of the blockchain transaction with respect to the rule; and
creating a notification comprising the compliance status.

2. The method of claim 1, wherein the values describing the asset comprise one or more of:
a company name, an individual's name, a financial figure, a financial account, a type of product, a geographical location, a transaction party, a date, and a time.

3. The method of claim 1, wherein the obligation data comprises one or more of a type of:
encryption, party data, quantity information, warranty information, location information, date information, trade rules and time information.

4. The method of claim 1, further comprising:
generating a compliance report or dashboard based on the compliance status of the blockchain transaction.

5. The method of claim 1, wherein the transforming comprises:
creating one or more executable rules based on the values describing the asset of the transaction attributes and the identified regulatory obligation; and
executing the one or more executable rules against the blockchain transaction.

6. The method of claim 1, further comprising:
transmitting the notification to a registered party.

7. The method of claim 5, further comprising:
creating one or more smart contracts comprising the one or more executable rules; and
executing the one or more smart contracts to process the transaction data of the blockchain transaction.

8. An apparatus, comprising:
a processor configured to:
extract obligation data from one or more of regulatory documents and regulatory rules, the obligation data specifying requirements for compliance with one or more regulatory standards,
identify transaction attributes of transaction data of a blockchain transaction, the transaction attributes including values describing an asset that is part of the blockchain transaction,
identify a regulatory obligation included in the extracted obligation data that is related to the blockchain transaction based on the values describing the asset of the transaction attributes, and
transform the values describing the asset of the transaction attributes and the identified regulatory obligation into a rule based on syntax of the identified regulatory obligation and execute the rule with respect to the blockchain transaction to determine a compliance status of the blockchain transaction with respect to the rule; and
a transmitter configured to:
transmit a notification comprising the compliance status.

9. The apparatus of claim 8, wherein the values describing the asset comprise one or more of:
a company name, an individual's name, a financial figure, a financial account, a type of product, a geographical location, a transaction party, a date, and a time.

10. The apparatus of claim 8, wherein the obligation data comprises one or more of:
a type of encryption, party data, quantity information, warranty information, location information, date information, trade rules and time information.

11. The apparatus of claim 8, wherein the processor is further configured to:
generate a compliance report or dashboard based on the compliance status of the blockchain transaction.

12. The apparatus of claim 8, wherein the processor is further configured to:
create one or more executable rules based on the values describing the asset of the transaction attributes and the identified regulatory obligation, and
execute the one or more executable rules against the blockchain transaction.

13. The apparatus of claim 8, wherein the notification is transmitted to a registered party.

14. The apparatus of claim 12, wherein the processor is further configured to:
create one or more smart contracts comprising the one or more executable rules; and
execute the one or more smart contracts to process the transaction data of the blockchain transaction.

15. A non-transitory computer readable storage medium configured to store at least one instruction that when executed by a processor causes the processor to perform:
extracting obligation data from one or more of regulatory documents and regulatory information sources, the obligation data specifying requirements for compliance with one or more regulatory standards;
identifying transaction attributes from transaction data of a blockchain transaction, the transaction attributes including values describing an asset that is part of the blockchain transaction;
identifying a regulatory obligation included in the extracted obligation data that is related to the blockchain transaction based on the values describing the asset of the transaction attributes;
transforming the values describing the asset of the transaction attributes and the identified regulatory obligation into a rule based on syntax of the identified regulatory obligation and executing the rule with respect to the blockchain transaction to determine a compliance status of the blockchain transaction with respect to the rule; and creating a notification comprising the compliance status.

16. The non-transitory computer readable storage medium of claim 15, wherein the values describing the asset comprise one or more of:

a company name, an individual's name, a financial figure, a financial account, a type of product, a geographical location, a transaction party, a date, and a time.

17. The non-transitory computer readable storage medium of claim 15, wherein the obligation data comprises one or more of:

a type of encryption, party data, quantity information, warranty information, location information, date information, trade rules and time information.

18. The non-transitory computer readable storage medium of claim 15, further configured to store at least one instruction that when executed by the processor causes the processor to perform:

creating one or more executable rules based on the values describing the asset of the transaction attributes and the identified regulatory obligation; and executing the one or more executable rules against the blockchain transaction.

19. The non-transitory computer readable storage medium of claim 18, further configured to store at least one instruction that when executed by the processor causes the processor to perform:

creating one or more smart contracts comprising the one or more executable rules; and executing the one or more smart contracts to process the transaction data of the blockchain transaction.

20. The method of claim 1, wherein the identifying the regulatory obligation that is related to the blockchain transaction comprises matching text content of the regulatory obligation to the values describing the asset via natural language processing (NLP).

* * * * *